United States Patent [19]
Matsuoka

[11] 3,783,404
[45] Jan. 1, 1974

[54] GAS LASER
[75] Inventor: Tohru Matsuoka, Tokyo, Japan
[73] Assignee: Nippon Electric Company, Limited, Tokyo, Japan
[22] Filed: Dec. 20, 1971
[21] Appl. No.: 210,067

[30] Foreign Application Priority Data
Dec. 18, 1970 Japan.............................. 45-1113123

[52] U.S. Cl. ............................................... 331/94.5
[51] Int. Cl. ............................................... H01s 3/08
[58] Field of Search .................................. 331/94.5; 356/106 RL

[56] References Cited
UNITED STATES PATENTS
3,566,302  2/1971  Rhodes .............................. 331/94.5

*Primary Examiner*—William L. Sikes
*Attorney*—Nichol M. Sandoe et al.

[57] ABSTRACT

A gas laser comprises a gas laser tube, an inner mirror having a fixed position within the tube, an outer mirror disposed outside the tube, and a side plate. The tube is pivotally coupled to the side plate. The tube is supported and prevented from moving pivotally whereby the angle of the inner mirror with respect to the outer mirror is adjusted.

5 Claims, 2 Drawing Figures

PATENTED JAN 1 1974  3,783,404

GAS LASER

BACKGROUND OF THE INVENTION

The present invention relates to a gas laser, and more particularly to a new gas laser having an improved arrangement for adjusting the relative position of the mirrors.

Presently known gas lasers fall generally in two categories; the inner mirror type and the outer mirror type. Another type is also known which has one inner mirror and one outer mirror.

Though the inner mirror type has advantages in that no dust adheres to the mirrors because they are contained within a discharge tube, the output power is enhanced because there is less optical loss caused by windows, and the structure is simpler. However, it has disadvantages in that internal modulation cannot be achieved, linearly polarized light cannot be obtained easily and, because the interval distance of the resonator cannot be strictly controlled, high stability in the oscillation frequency cannot be realized, etc.

The outer mirror type laser has advantages in that linearly polarized light can be easily obtained, the interval distance of the resonator can be kept constant with a high precision, mode selection can be realized by replacing the mirrors, and internal modulation can be achieved, etc. But it has disadvantages in that the output power is less than that of the inner mirror type due to the loss caused by the windows, and the structure is more complex, etc.

Therefore, for the purpose of eliminating the respective disadvantages and enhancing the respective advantages, a one-side-inner mirror type of laser has been devised but this type has not been brought into a practical use, because in general the coupling between the laser tube, made principally of glass, and the resonator, made principally of metallic materials, has not been successfully achieved. In other words, in the case of the one-side-inner mirror type of laser in the prior art, the support means for a laser tube and the adjusting means for an outer mirror with respect to an inner mirror in an optical resonator were not integrally constructed, was unduly complex, and adjustment was difficult. Consequently, the above-described advantages of this hybrid type laser have not been fully realized.

Therefore, an object of the present invention is the provision of a novel laser that is simple in structure, easily adjusted, and mechanically stable by improving the coupling means between a one-side-inner mirror type of laser tube and an optical resonator.

SUMMARY OF THE INVENTION

A gas laser comprises a gas laser tube, an inner mirror having a fixed position within the tube, an outer mirror disposed outside the tube, and a side plate. A coupling means is provided for pivotally connecting the tube to the side plate, and a means is provided for supporting the tube and preventing pivotal movement thereof from a selected position whereby the angle of the inner mirror with respect to the outer mirror can be adjusted.

Since the laser tube forms a component of the mirror adjust means, the number of component parts is reduced significantly. Also, the means for adjusting the tilt angle of the outer mirror becomes quite unnecessary. Therefore, the number of components that can be subjected to displacement or backlash is reduced. Thus, the stability in operation is enhanced and the reliability of the entire apparatus is improved. The so-called "gimbal" means used in the prior art for supporting the outer mirror and for adjusting the outer mirror independently becomes unnecessary, and simultaneously the means for supporting the entire laser tube is greatly simplified.

As the laser tube itself is used as an arm for adjusting the mirror, the resolution for adjustment is greatly increased, and the adjustment for oscillation becomes simpler and more reliable.

Since the distance between the mirrors, that is, the resonator interval distance, is substantially independent of the mirror adjustment, the adjustment for oscillation of a single frequency stabilized laser in which the interval distance between the mirrors is precisely controlled is readily accomplished.

BRIEF DESCRIPTION OF THE DRAWINGS

For a more extensive discussion of the invention, reference may be made to the following detailed description of an exemplary embodiment of the invention taken in conjunction with the accompanying figures of the drawings in which.

DESCRIPTION OF THE PREFERRED EMBODIMENT

Figure 1:
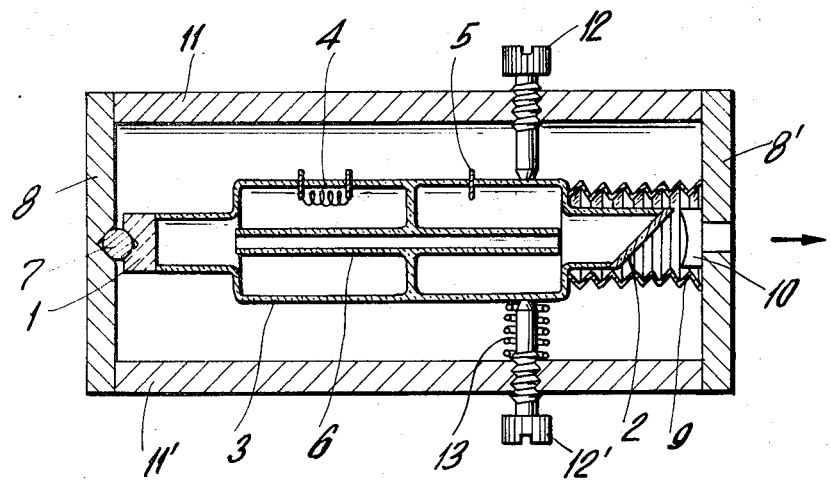
FIG. 1 is a cross sectional view of a laser constructed in accordance with the invention.

FIG. 1 shows a preferred embodiment of the present invention in which a sealed gas laer tube 3 having an inner mirror 1 and a Brewster window 2 fixedly positioned therein, is filled with a gaseous mixture of helium and neon. A discharge is caused by connecting an electric power supply (not shown) across a cathode 4 and an anode 5, to produce plasma within a capillary 6. In this way, the tube 3 is brought into a state in which laser operation can take place. An inner mirror 1 is positioned close to a side plate 8 of an optical resonator where it is held in position by a coupling means for pivotally connecting the tube 3 to the side plate 8. The coupling means includes a sphere 7 between the side plate 8 and the mirror 1 of the tube 3, and a spring 9 that engages a side plate 8' opposite the side plate 8. The tube 3 is urged against the side plate 8 by the spring 9 so that the plate 8 and tube 3 both engage the sphere 7. Another function of the spring 9 and a surrounding cover is to protect the Brewster window 2 and an outer mirror 10 enclosed therein from dust. Although the outer mirror 10, which is outside the tube 3, is affixed to the side plate 8' in this embodiment, it need not be directly affixed thereto, but could, instead, be affixed to an auxiliary member for coupling the tube 3 and the inner mirror 1 to the side plate 8.

In the embodiment of FIG. 1, the fine adjustment of the relative tilt angle of the directly affixed outer mirror 10 with respect to the inner mirror 1 is achieved by a means for supporting the tube 3 and preventing pivotal movement thereof comprising a plurality of fine adjustment screws 12 and 12'. Although not shown in FIG. 1, another pair of screws are provided at a right angle to the plane of the drawing, and thus the arrangement is such that the side surface of the laser tube is supported by means of four adjustment screws in all. As the inner mirror 1 has been preliminarily adjusted as to its optical axis with respect to the capillary 6 and fixedly secured to the laser tube 3, if the outer wall of the laser tube 3 is adjusted in position by means of the fine adjust screws 12 or 12', then the mirror 1 can be finely adjusted at a desired angle to the mirror 10 through a pivotal movement about the sphere body 7. A spring 13 disposed around the screw 12' functions to make the adjustment smoother. Upon completion of the adjustment, by the screws 12 and 12' (and the other pair of adjustment screws not shown in the drawings) and a main spring 9, the laser tube 3 is fixedly supported at the most desirable position with respect to the outer frame of the optical resonator which includes the support plates 11 and 11' and the side plates 8 and 8'.

Here, analysis will be made in connection with the resolution of the adjustment angle upon making a fine adjustment of the optical axis. At first, the resolution of the adjustment angle is represented by $\Delta l/l$ radians, on the basis of the feed amount $\Delta l$ of the screw and the distance $l$ from the sphere body 7 to the points where the screws 12 and 12' make contact with the laser tube 3.

For instance, if a micrometer head is employed as the adjustment screw 12, a feed as small as $\Delta l = 0.01$ mm is readily realized. Therefore, assuming the $l = 100$ mm, the screw would have a resolution of $10^{-4}$ radian (about 20 inches). This is equal to the resolution of the commercially available precision type mirror mounts.

Figure 2:
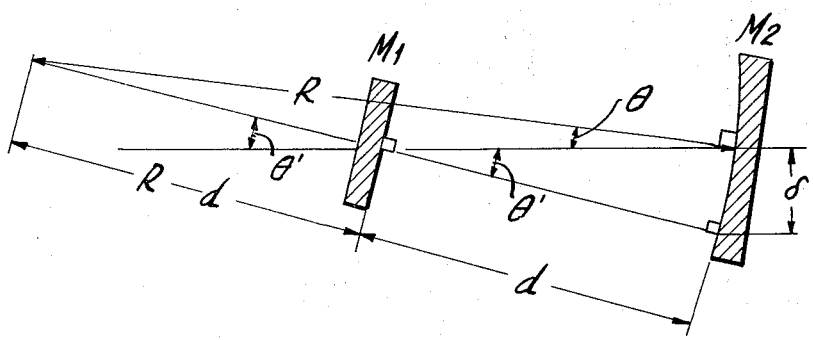
FIG. 2 is a schematic representation of some components of the laser of FIG. 1.

Now, an analysis will be made of the extent to which optical axis is moved with respect to the outer mirror 10 if it is positioned at a small tilt angle. It is assumed that in FIG. 2 an outer mirror $M_2$ (corresponding to the mirror 10) having a radius of curvature R is tilted by an angle $\theta$. Consequently, an inner mirror $M_1$ (corresponding to the mirror 1) at a distance $d$ from the mirror $M_2$ is required to be tilted by an angle $\theta'$. Then, from the same figure one can readily obtain the following relation:

$$(R - d) \theta' = R\theta \quad (1)$$

Therefore, on the outer mirror $M_2$, the optical axis is deviated by $\delta$, and from Eq. (1) and the following equation can be written:

$$d\theta' = \delta \quad (2)$$

and equation 3 can be derived as follows:

$$\delta = (Rd/R - d) \theta \quad (3)$$

In general, according to conventional precision machining practice, the angle of tilt $\theta$ may be as large as several tens of milli-radians, so that in the case of a mirror having a longer radius of curvature $(R \gg d)$, the value of $\delta$ is generally less than 1 mm, while in the case of a mirror having a shorter radius of curvature $(R \approx d)$, the deviation is of the order of several millimeters. Therefore, in the latter case, it is necessary to minimize the difference in length between the support plates 11 and 11' shown in FIG. 1. This minimizes the tilt of the outer mirror. Viewed in another way, it can be said that in this latter case the change of output caused by the diffraction loss with respect to the movements of the screws 12 and 12' becomes extremely gradual because the value of $\delta$ is small.

It will be understood from the above discussion that in order to enhance the resolution of adjustment, the mirror 10 may be formed to have a shorter radius of curvature. If it is desired to minimize the deviation of the optical axis caused by an adjustment, then a concave mirror may be employed as the mirror 1 and a flat mirror may be employed as the mirror 10.

As described above, according to the present invention, a device or means for directly adjusting the tilt angle of the reflector mirror is quite unnecessary. That is, it is only necessary to adjust the supporting angle of the laser tube, and thus important advantages can be obtained such that the operation is extremely simplified and the number of component parts is greatly reduced.

Since the distance between the mirrors is not substantially varied, in contrast to the case where the mirror is adjusted by means of gimbals or the like conventionally used in the prior art, the present invention provides a very effective laser, which may be a single-frequency laser, in which the distance between the mirrors is controlled with a high degree of precision.

Because the laser tube 3 is prevented from movement in both the vertical and horizontal directions, the present invention an provide a most ideal supporting arrangement.

For the above-mentioned reasons, the present invention provides a novel laser that incorporates the best features of both the inner mirror and the outer mirror types. Linearly polarized light is emitted, the output power is high, internal modulation is possible, the distance between the mirrors can be maintained constant with a high degree of precision, the number of the component parts is reduced, and the reliability is very high.

Conical counterboring is used to form the retaining portion on the mirror 1 and the side plate 8 that engages the sphere 7 in the above-described embodiment of the invention. The sphere 7 may be fixedly secured to either the mirror or the side plate 8. If this construction is employed, a hemisphere may be substituted fo the sphere 7. Alternatively, the structure may be such that an accessory component is associated with the mirror 1 to engage the sphere 7.

A commercially available steel ball is preferably used for the sphere 7, but it may be a ball made of an insulating material such as glass. Instead of using a sphere, the mirror 1 and the side plate 8 may be brought in contact with each other via a sharp tip and a conical counterbore as is the case with a conventional pivot bearing.

Although the laser tube 3 is illustrated in a coaxial relationship in FIG. 1, it need not be so constructed. Furthermore, while the adjustment screws 12 and 12' make contact with the side surface of the laser tube 3 substantially at a right angle thereto, it is also possible to construct the tube wall of the laser tube 3 in a conical shape so that a component of force is exerted toward the sphere 7. In this case, the spring 9 can be omitted from the coupling means.

In the embodiment illustrated in FIG. 1, an example is shown in which a fine adjustment means is provided for adjustment in four directions, i.e., upward, downward, leftward, and rightward, with respect to the laser tube, but the present invention is not limited to this arrangement. For instance, means for supporting and positioning the laser tube from only three directions may readily be utilized by appropriately combining screws and springs.

Although the present invention has been described above with respect to a He—Ne gas laser, it may of course be employed in connection with laser tubes filled with other gases. These and many other modifications will be apparent to those skilled in the art. Thus, while the present invention has been described above with reference to a preferred embodiment, the spirit and scope of the invention is limited only by the following claims.

I claim:

1. A gas laser comprising a gas laser tube, an inner mirror fixedly secured to the tube, an outer mirror disposed outside the tube, a side plate, coupling means for pivotally connecting the tube to the side plate, and adjustment means for supporting the tube and preventing pivotal movement thereof from a selected position whereby the angle of the inner mirror with respect to the outer mirror can be adjusted.

2. The laser of claim 1 wherein the connecting means comprises at least a hemisphere positioned between the side plate and the tube.

3. The laser of claim 1 wherein the connecting means comprises a sphere that is engaged by the side plate and the tube.

4. The laser of claim 1 wherein the connecting means comprises a sphere that is engaged by the side plate and the tube, and a spring that urges the tube toward the side plate.

5. The laser of claim 1 wherein the means for supporting the tube and preventing pivotal movement thereof comprises at least three screws that engage the sides of the tube.

* * * * *

UNITED STATES PATENT OFFICE
CERTIFICATE OF CORRECTION

Patent No. 3,783,404     Dated January 1, 1974

Inventor(s) T. MATSUOKA

It is certified that error appears in the above-identified patent and that said Letters Patent are hereby corrected as shown below:

Foreign Application Priority Data

THE DOCUMENT NO. "45-1113123" should be --45-113123--.

Signed and sealed this 21st day of May 1974.

(SEAL)
Attest:

EDWARD M.FLETCHER,JR.
Attesting Officer

C. MARSHALL DANN
Commissioner of Patents